United States Patent [19]

Karasawa et al.

[11] Patent Number: 5,204,981
[45] Date of Patent: Apr. 20, 1993

[54] INTERFERENCE ELIMINATION SYSTEM

[75] Inventors: Yoshio Karasawa, Hatoyama; Masayuki Yasunaga, Tokyo; Hisato Iwai, Ohmiya, all of Japan

[73] Assignee: Kokusai Denshin Denwa Kabushiki Kaisha, Tokyo, Japan

[21] Appl. No.: 663,404

[22] Filed: Mar. 1, 1991

[30] Foreign Application Priority Data

Jul. 19, 1990 [JP] Japan .................................. 2-189412

[51] Int. Cl.⁵ .............................................. H04B 1/06
[52] U.S. Cl. ............................... 455/277.1; 455/277.2; 455/278.1; 379/172
[58] Field of Search ............ 455/277, 278, 285, 277.1, 455/277.2, 278.1; 359/172

[56] References Cited

U.S. PATENT DOCUMENTS

3,836,929  9/1974  White .................................... 455/278
4,279,036  7/1981  Pfund ................................... 359/172
4,736,455  4/1988  Matsue et al. ........................ 455/278
4,876,743 10/1989  Lindenmeier et al. ............. 455/278

Primary Examiner—Reinhard J. Eisenzopf
Assistant Examiner—Timothy H. Keough
Attorney, Agent, or Firm—Emmanuel J. Lobato; Robert E. Burns

[57] ABSTRACT

Accordingly to the present invention, when an incidence angle of a direct wave or a satellite elevation angle reaches a predetermined value, signals from two (or more) antennas, which are disposed at positions where variations in the field intensities of radio waves recevied by the two antennas are negatively correlated (i.e. when the received signal level of one of them is low, the received signal level of the other is high) or uncorrelated (i.e. the variations are not related to each other), are successively or discretely switched at a suitable switching period, by which burst-like errors are spread with time to perform the de-interleave or interleave function in decoding transmitted signals.

2 Claims, 10 Drawing Sheets

INTERFERENCE ELIMINATION SYSTEM

BACKGROUND OF THE INVENTION

The present invention relates to an interference elimination system, a transmitter and a receiver in a radio communication system which suffers from fading caused by reflected waves from the surface of the sea, the ground, etc.

In a case of electric waves propagating on the sea as in a satellite-ship link of a maritime satellite communication system, waves reflected from the surface of the sea (sea reflected waves) as well as waves direct from the satellite are received by an antenna, hence the signal strength may sometimes be markedly lowered by interference of the direct and the reflected waves with each other. To prevent the degradation of speech quality by such interference, it is desirable to minimize the effects of the sea reflected waves.

However, any suitable techniques to effectively suppress the sea reflected waves have not yet been proposed.

SUMMARY OF THE INVENTION

An object of the invention is to provide an interference elimination system and a device which permit elimination of the ground reflected wave or sea reflected wave in the case of a calm sea without using the feedback system and by controlling interference in transmission and reception at one of the transmitting and receiving sides.

According to an aspect of the present invention, the digital radio communication system, which includes, in combination, the FEC or similar error correcting function and the interleave function, comprises: in one of radio stations which is closer to the source of generation of an interference such as a sea or ground reflected wave, at least two antennas, switching control means whereby received signals from the antennas or input signals to the antennas are switched successively or discretely at a switching period shorter than that of the interference wave, and elevation angle detect means for rendering the switching control means to be inoperative when the angle of incidence of a direct wave to each antenna or a satellite elevation angle exceeds a predetermined value. This system has its feature in that when the above-mentioned incidence angle or satellite elevation angle is smaller than the predetermined value, the influence of the interference wave is spread with time and hence is lessened accordingly.

According to another aspect of the present invention, the digital radio communication system, which includes, in combination, an coder and for outputting the stored signal sequence output in a time series different from that of the input signal sequence; a modulator for modulating the signal sequence from the interleaver into an intermediate-frequency signal; an RF unit or radio frequency circuits for converting the output of the modulator to a transmission frequency wave and for amplifying the converted wave to a required level; at least two antennas disposed to be negatively correlated or uncorrelated with each other in terms of fading of the transmission frequency wave; a variable power divider for successively or discretely switching the output signal of the RF unit at a switching period shorter than that of the fading to distribute the output signal to the two antennas; a combiner controller for controlling the dividing ratio of the variable power divider; and elevation angle detect means for suspending the switching operation of the combiner controller when the angle of incidence of a direct wave to each antenna or its satellite elevation angle exceeds a predetermined value. This system has its feature in that when the incidence angle or satellite elevation angle is smaller than the predetermined value, the influence of an interference wave on a receiving system of a radio station receiving signals transmitted from the antennas is spread with time and hence is lessened accordingly.

According to the present invention, when an incidence angle of a direct wave or a satellite elevation angle reaches a predetermined value, signals from two (or more) antennas, which are disposed at positions where variations in the field intensities of radio waves received by the two antennas are negatively correlated (i.e. when the received signal strength of one of them is low, the received signal strength of the other is high) or uncorrelated (i.e. the variations are not related to each other), are successively or discretely switched at a suitable switching period, by which burst-like errors are spread with time to perform the de-interleave or interleave function in decoding transmitted signals.

BRIEF DESCRIPTION OF THE DRAWINGS

The present invention will be described in detail below in comparison with prior art with reference to the accompanying drawings, in which.

DETAILED DESCRIPTION

To make differences between prior art and the present invention clear, examples of prior art will first be described.

Figure 8:
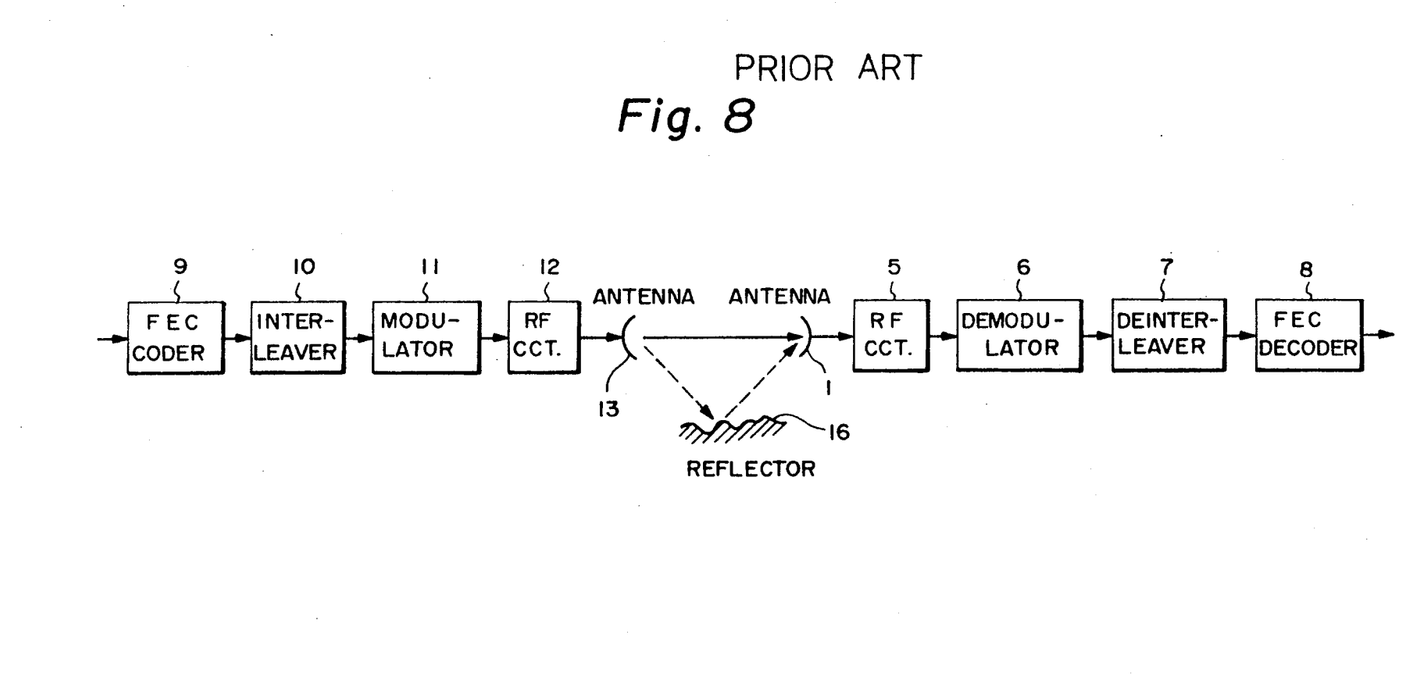
FIG. 8 is a block diagram illustrating a conventional receiving system formed by combining an error correcting system with an interleave system.

One possible solution to this problem is a block interleave (hereinafter referred to simply as "interleave") system applicable to a digital transmission system. FIG. 8 is a block diagram showing a conventional system configuration provided with both of a forward error correction system (FEC system effective for random errors) and the interleave system. A FEC coder 9 adds an error correcting code to information to be transmitted to form a signal sequence. An interleaver 10 stores a fixed amount of signal sequence output from the FEC coder 9 and outputs it in a time series different from that of the input. That is, the interleaver 10 stores a fixed amount of data in a predetermined two-dimensional memory and provides the output, for example, in a column order if the input was applied in a row order. A modulator 11 converts the signal sequence output from the interleaver 10 into a modulated intermediate-frequency signal. An RF unit 12 converts the output of the modulator 11 into a transmission-frequency wave and amplifies it to a required level. An antenna 13 transmits the output signal of the RF unit 12. A reflecting object 16 is, for instance, the surface of the sea. An antenna 1 receives the transmitted signal from the antenna 13 directly or indirectly via the reflecting object 16. An RF unit 5 amplifies the received signal of the antenna 1 and converts its frequency to the intermediate frequency. A demodulator 6 receives the output of the RF unit 5 and demodulates the output into the signal sequence which is the signal data modulated at the transmitting station. The de-interleaver 7 has a function of returning the data to its original time series by reversing the procedure carried out by the interleaver 10. A FEC decoder 8 makes an error correction in the signal sequence output from the de-interleaver 7 to restore the transmitted information.

Figure 9:
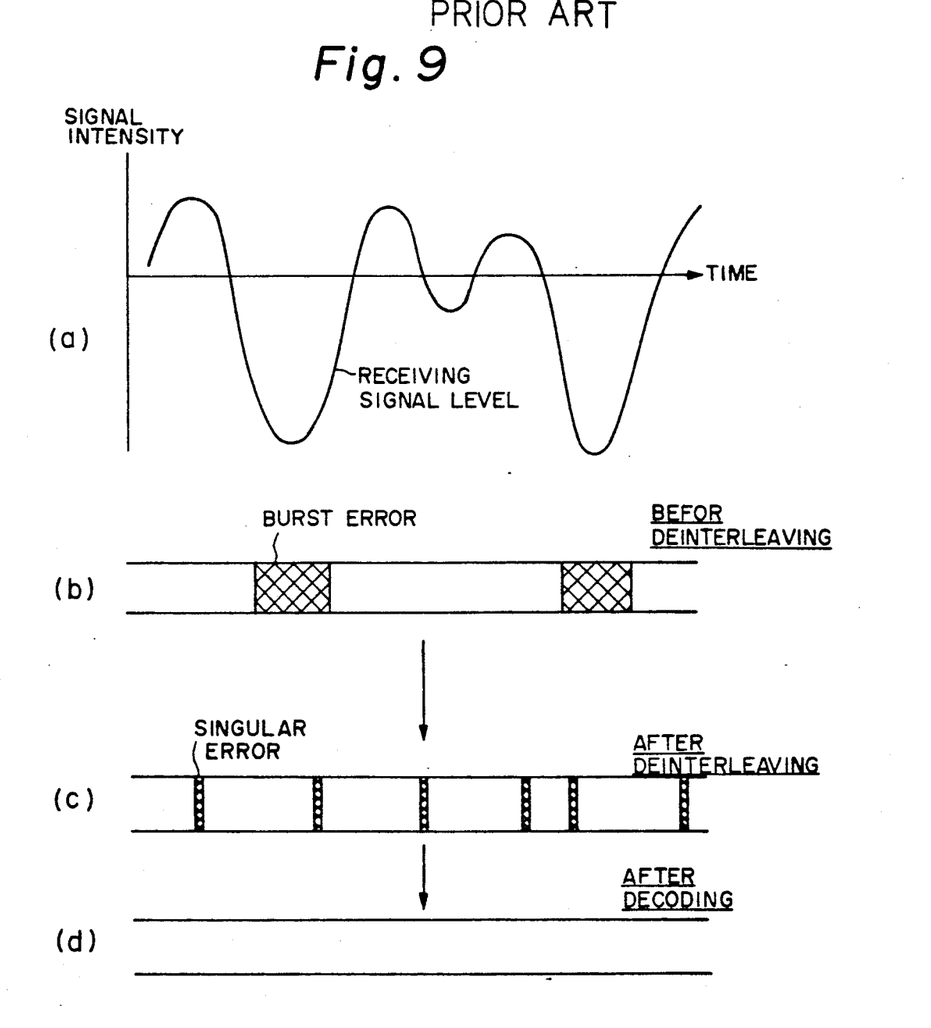
FIGS. 9(a) to (d) are waveform diagrams showing how burst-like errors occur and the error correcting effect in case of using the conventional receiving system.

With such an interleave system, as shown in FIG. 9, burst-like errors (b), which occur in cluster when a signal (a) varying due to fading goes to be lower than a certain level, are input into the FEC decoder 8 randomly and separately in time (c), hence the error correcting function is effectively performed and the burst-like errors are corrected accordingly (d). It is well-known in the art that such a fading suppression system obtained by the combined use of the error correction system (FEC) and the interleave system produces a marked effect of improving the burst-like errors for which the FEC system is not effective when used singly.

On the other hand, there has been proposed a space diversity system in which when the receiving level of an antenna lowers owing to scattering of waves by the ground, objects thereon, etc., or owing to a rainfall attenuation or the like, the antenna is switched to another antenna disposed at a remote location to raise its receiving level.

Figure 10:
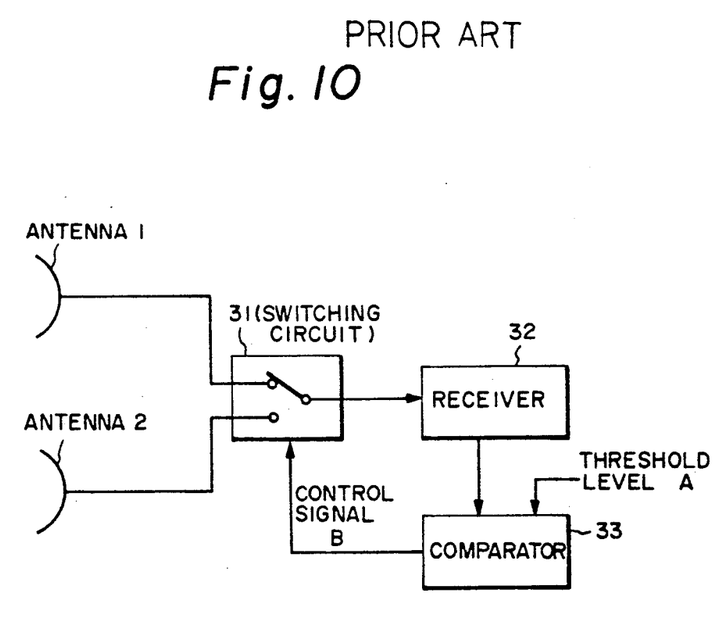
FIG. 10 is a block diagram showing a conventional space diversity system.

FIG. 10 is a block diagram of a switch and stay diversity system simpler in construction than any other space diversity systems. Reference numerals 1 and 2 denote antennas disposed at remote locations, 31 a switching circuit for switching between the antennas 1 and 2 in response to a control signal B, 32 a receiver for demodulating a signal from the switched antenna, and 33 a comparator which generates the control signal B for switching the antennas from one to the other when the receiving level drops from a level higher than a predetermined threshold level A to a lower level.

With this space diversity system, it is possible to lessen the influence of an interference wave gently varying with time, because in case of fading being caused in the one antenna by the interference the antenna can be switched to the other antenna less affected by the interference wave, based on the transmission quality or the like. Moreover, this system has the advantage of using only one receiver 32 which is generally inexpensive, because the antennas are switched at a stage preceding the receiver 32.

In order that the interleave system may be effective in the system in which it is combined with the FEC or similar error correction system, it is necessary that the time length of data to be stored by the interleaver be longer than the mean duration of the burst error. In low-speed data communications the time allowed for interleave is usually within 10 seconds under restrictions of the storage capacity and the allowed delay time. However, when the sea is calm and smooth, reflected waves undergo no appreciable temporal variations; consequently, in the worst case, a direct wave and a reflected wave have a phase difference of 180° from each other so that the signal strength remains low, for example, for one minute or longer. In this instance, burst-like errors continue in the data stored in the interleaver. Accordingly, even if the stored data is diffused in terms of time, the burst-like errors still continue so that this poses a problem in that the prior art system such as shown in FIG. 8 cannot suppress fading.

On the other hand, the conventional space diversity system requires a feedback system for switching the antennas 1 and 2, based on transmission quality such as the receiving level. The feedback system for switching the antennas, based on transmission quality, is very complicated in its actual device configuration. Further, the fading caused by an interference is uncorrelated between the transmitting side and the receiving side; so that antenna switching by the conventional space diversity system depicted in FIG. 10 improves the received signal quality in the receiving side but does not bring about any effect on the transmitted signal quality in the transmitting side. Thus, the traditional space diversity system has a shortcoming that characteristics are improved only at the receiving side (a mobile station) with respect to the interference which is uncorrelated between transmission and reception. While in the above the prior art has been described in respect of the sea reflected wave, ground reflected waves also pose a similar problem in an automobile radio system or the like.

As described above, the conventional interleave system cannot effectively alleviate the problem of fading by sea reflected waves from a calm sea or ground reflected waves which bring about very slow temporal variations in the signal strength. Moreover, the conventional space diversity system calls for a complex-structured feedback system and is defective in that when no correlation exists between variations in the received signal level at the one station (down-link fading) and in the received signal level at the other (i.e. remote) side (up-link fading), the fading alleviating effect is limited only to the receiving side (namely, down-link fading). The present invention will be described below. FEC or similar error correcting function and an interleave function, comprises: at least two antennas disposed so as to be negatively correlated or uncorrelated with each other in terms of fading of received signals; a variable power combiner for switching input signals to the plurality of antennas at a switching period shorter than that of the fading; a combiner controller for controlling the combining ratio in the variable power combiner; RF unit or radio frequency circuits for amplifying the received signal output from the variable power combiner and for converting the frequency of the received signal to an intermediate frequency; a demodulator for receiving the output of the RF unit to demodulate the received signal into a modulated signal sequence; a de-interleaver for recovering the signal sequence of the output from the demodulator to its original time sequence; an FEC decoder for making an error correction in the signal sequence of the output from the de-interleaver to regenerate the transmitted information; and elevation angle detect means for suspending the switching operation of the combiner controller when the angle of incidence of a direct wave to each antenna or the satellite elevation angle exceeds a predetermined value. This system has its feature in that when the above-mentioned incidence angle or satellite elevation angle is smaller than the predetermined value, the influence of an interference wave received by each antenna is spread with time and hence is lessened accordingly.

When the incidence angle of the direct wave or the satellite elevation angle exceeds a predetermined value (about 15 degrees or more), the influence of fading decreases, so that transmitted signals are received by the one of two antennas (usually, the upper antenna). The successive switching herein mentioned is a method of continuously varying the combining ratio of the powers of signals from antennas 1 and 2 within the range of between 0 and 100%. In case of 0%, signals from only the antenna 2 are output; in a case of 100%, signals from only the antenna 1 are output; and in case of 40%, 40% of the signal power from the antenna 1 and 60% of signal power from the antenna 2 are combined. The discrete switching is a method of changing over the outputs of the antennas 1 and 2 by a switch (0% and 100%, or including intermediate values). In either case, when the received signal strength of the one antenna is low, if transmitted signals are received by that antenna alone, burst-like errors occur one after another; this cannot be remedied even by the function of the interleave system. However, since the received signal strength of the other antenna is surely high, if the two antennas are switched at proper periods faster than that of the interference wave, then the errors become burst-like ones of a relatively short duration; thus, it is possible to expect the effect intended by the combined use of the interleave and the FEC.

Embodiment

Figure 1:
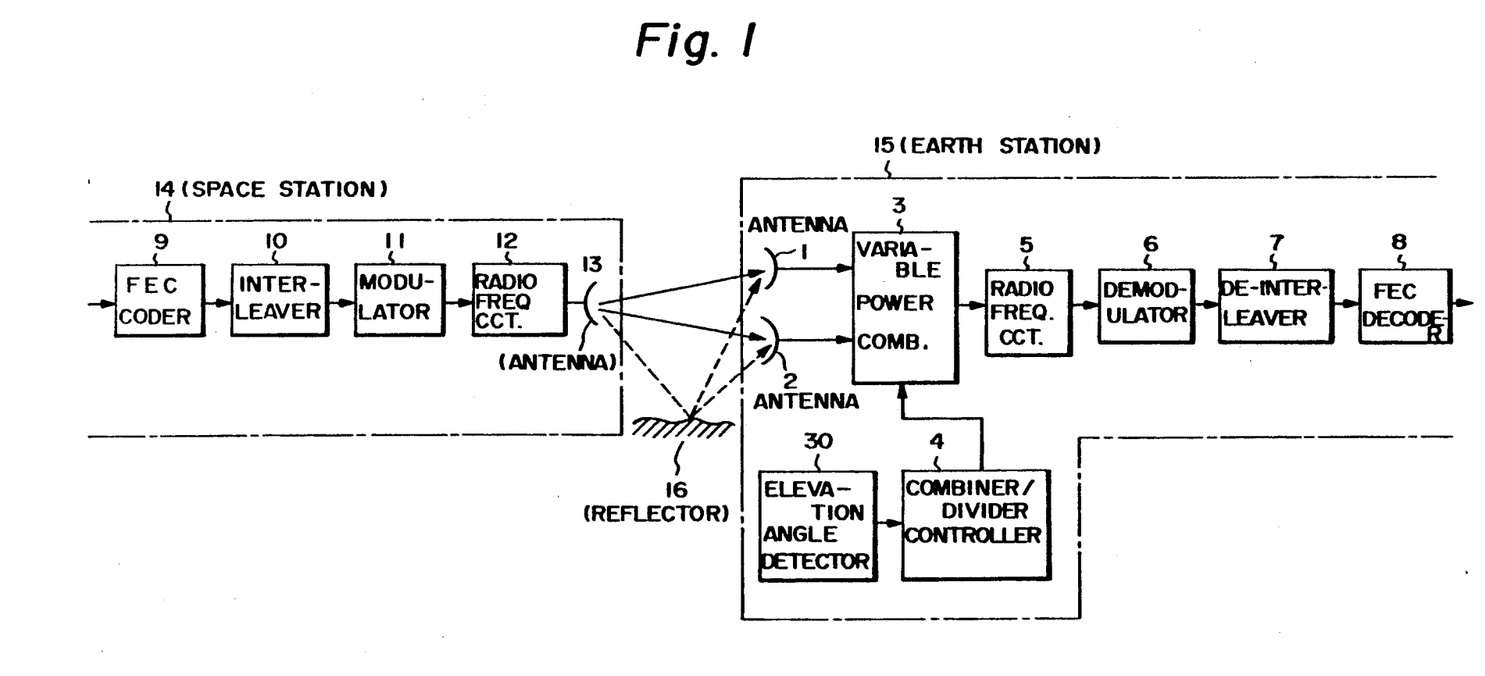
FIG. 1 is a block diagram illustrating the interference elimination system of the present invention.

With reference to the accompanying drawings, an embodiment of the invention will hereinafter be described. FIG. 1 illustrates an example of the basic constitution of the present invention. In FIG. 1 one of two radio stations is shown to be a space station 14 and the other an earth station 15, for convenience of description, but they may also be earth stations. In practice, the space station possesses only signal amplifying and frequency-converting functions in many cases, and in such a case, all features in the space station 1 in FIG. 1 are provided in the counterpart on the earth.

Figure 2:
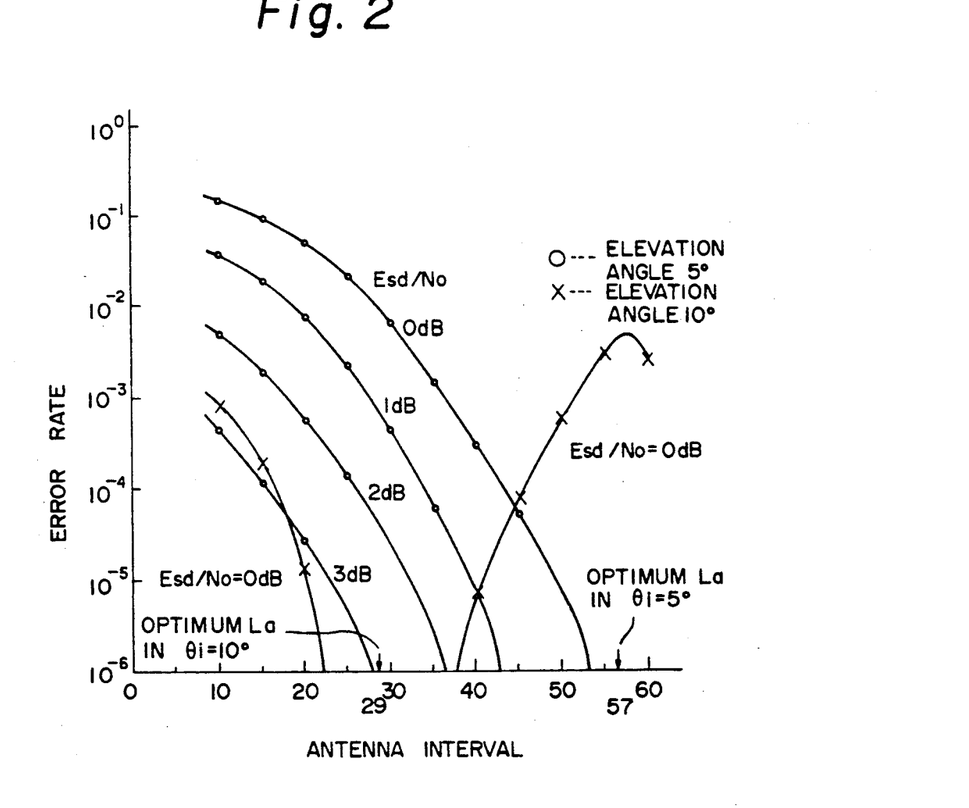
FIG. 2 is a graph showing the relationship of optimum antenna spacing to the satellite elevation angle for use in the interference elimination system of the present invention.

The antennas 1 and 2 of the earth station 15 are disposed so that temporal variations of fading are negatively correlated or uncorrelated with each other. The degree of correlation depends on the antenna spacing and the satellite elevation angle. FIG. 2 is a graph showing the relationships between the antenna spacing and the bit error ratio with respect to satellite elevation angles of 5° (indicated by white circles) and 10° (indicated by crosses) in an application of the present invention, with a signal-to-noise ratio free from fading and interference (Esd/No) used as a parameter. As is seen from FIG. 2, an optimum antenna spacing La is 57 cm for the satellite elevation angle of 5° and 29 cm for 10°, and the best results could be obtained by changing the antenna spacing in accordance with the satellite elevation angle. In the digital system, however, since the signal-to-noise ratio from fading and interference (Esd/No) is usually higher than 3 dB, good results could be obtained, even if the antenna spacing La is fixed in the range of between 30 and 35 cm, for example. A reflector 16 is the surface of the sea or the like which reflects radio waves. A variable power combiner 3 has a function of successively or discretely switching received signals from the two antennas 1 and 2 at a properly predetermined switching period shorter than that of the interference wave to combine the received signals in a desired ratio. A combiner controller 4 controls the combining ratio of the output from the variable power combiner 3. Radio frequency circuits 5 amplify the received signal output from the variable power combiner 3 and frequency-convert the received signal output into the intermediate-frequency signal. A demodulator 6 receives the output of the RF circuits 5 and demodulates to obtain a signal sequence which corresponds to signal data modulated at the transmitting side. A de-interleaver 7 restores the signal sequence, which is the output from the demodulator 7, to a signal sequence of the original time series. An FEC decoder 8 performs an error correction in the signal sequence output from the de-interleaver 7 to restore transmitted information.

Reference numeral 30 denotes an elevation angle detector which detects the incidence angle of radio waves, based on satellite elevation angle information, and determines whether the antennas 1 and 2 are switched or only one of them is fixedly used for reception.

Figure 3:
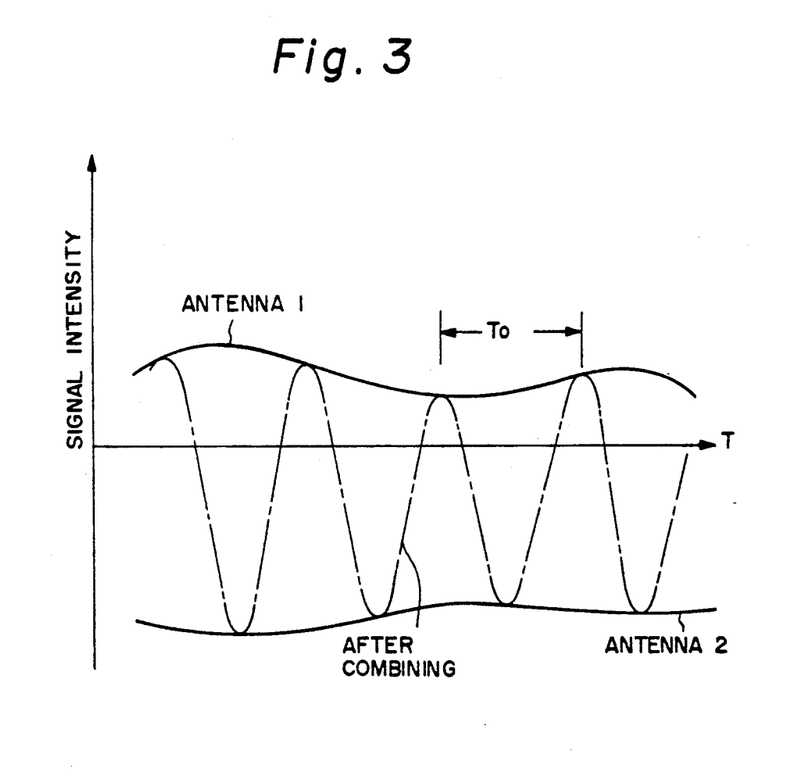
FIG. 3 is a characteristic diagram showing the levels of signals received by two antennas and the received signal level obtained after continuous switching by the present invention.

FIG. 3 is a characteristic diagram showing the relationships between the received signal level of each of the antennas 1 and 2 and the received signal level obtained after the antennas were successively switched according to the present invention. FIG. 3 demonstrates that when the sea is calm, the use of only one antenna keeps the signal level to be low as in the case of the antenna 2, that in such a case, the signal level increases in the other antenna 1 disposed at a position where its received signal strength is negatively correlated with that of the antenna 1, and the received signal level periodically varies (as indicated by the one-dot chain line) when the antennas were successively switched at a switching period $T_0$ according to the present invention. By selecting the period $T_0$ to be shorter than the variation period of fading (In FIG. 3 only a part of a long-period variation is shown for each antenna) and the data storage time of the interleaver, a variation shown in FIG. 9(a) is equivalently obtained so that fading is alleviated, on the base of the principles described in respect of FIG. 9.

An FEC coder 9 in the space station 14 adds an error correcting code to transmitted information to produce a signal sequence. An interleaver 10 sequentially stores a fixed amount of signal sequences output from the FEC coder 9 and outputs the stored signal in a time series different from that of the input. A modulator 11 converts the signal sequence output from the interleaver 10 into an intermediate-frequency signal. Radio frequency circuits 12 converts the output of the modulator 11 to a transmitting frequency signal and amplifies the converted output to a required level. An antenna 13 transmits the output signal of the radio frequency circuits 12.

Figure 4:
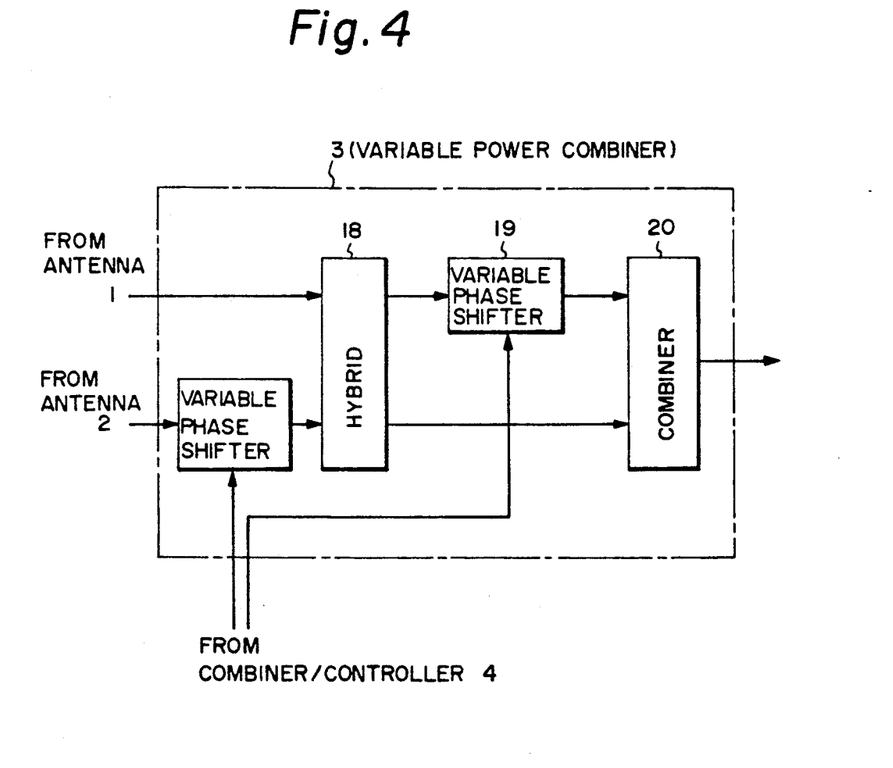
FIG. 4 is a block diagram illustrating a variable combiner for use in the present invention.

FIG. 4 shows an example of the variable power combiner 3 which is composed of a hybrid 18, a combiner 20 and variable phase shifters 17 and 19. The variable phase shifter 19 has a function of successively or discretely varying the phase shift amount in the range from $-90°$ to $90°$. With the construction shown in FIG. 4, when the phase shift amount of the variable phase shifter 19 is $0°$, the output from the combiner 20 is composed of signals from the antennas 1 and 2 in the ratio of 1:1. When the phase shift amount of the variable phase shifter 19 is $90°$, the output of the combiner 20 is composed only of the signal from the antenna 2. When the phase shift amount of the variable phase shifter 19 is $-90°$, the output of the combiner 20 is composed only of the signal from the antenna 1. Thus, by changing the phase shift amount of the variable shift register 19 within the range of $-90°$ to $90°$, the output of the combiner 20 is composed of signals from the antennas 1 and 2 in a desired ratio. The variable phase shifter 17 makes a phase adjustment so that a direct wave component from a satellite contained in the signal component of the antenna 1 may become in-phase with the counterpart of the signal component of the antenna 2 when the phase shift amount of the variable phase shifter 19 is about $0°$ while the signals from the antennas 1 and 2 are combined in substantially the same ratio. When the direct waves are combined in in-phase relation to each other, the signal level increases, providing for an optimum receiving state. The combiner controller 4 controls the combining ratio of the variable power combiner 3. The period ($T_0$) with which the outputs of the two antennas 1 and 2 are switched can be set to an arbitrary value under the conditions where it is sufficiently long for the receiving system to follow the speed of antenna switching and is sufficiently shorter than the data storage time of the interleaver 10. In case of applying the invention to a ship station of the maritime satellite communication system, a proper switching period is in the range of 0.1 to 10 sec or so partly because a transmission delay time must be held within several seconds and partly because a variation below 0.1 is difficult for the system to recover the carrier signal.

With the provision of antenna spacing control means for automatically or manually controlling the spacing between the antennas 1 and 2 in accordance with the satellite elevation angle, though not shown for the sake of brevity, the received signal level can substantially be increased as will be seen from FIG. 2. In case of a small ship, however, the antenna spacing may also be fixed from an economical point of view.

The elevation angle detector 30 needs to detect the elevation angle from satellite tracking information containing information about the current position of the satellite and information about the current position of the ship. The elevation angle detector 30 need not always be automatic but may also be manually operated to turn ON and OFF the combiner controller 4.

While the invention has been described in connection with the case of reception by the ship station for the sake of brevity, the invention can equally be applied to the case of transmission from the ship station, simply by replacing the variable power combiner 3 by a variable power divider.

Figure 5:
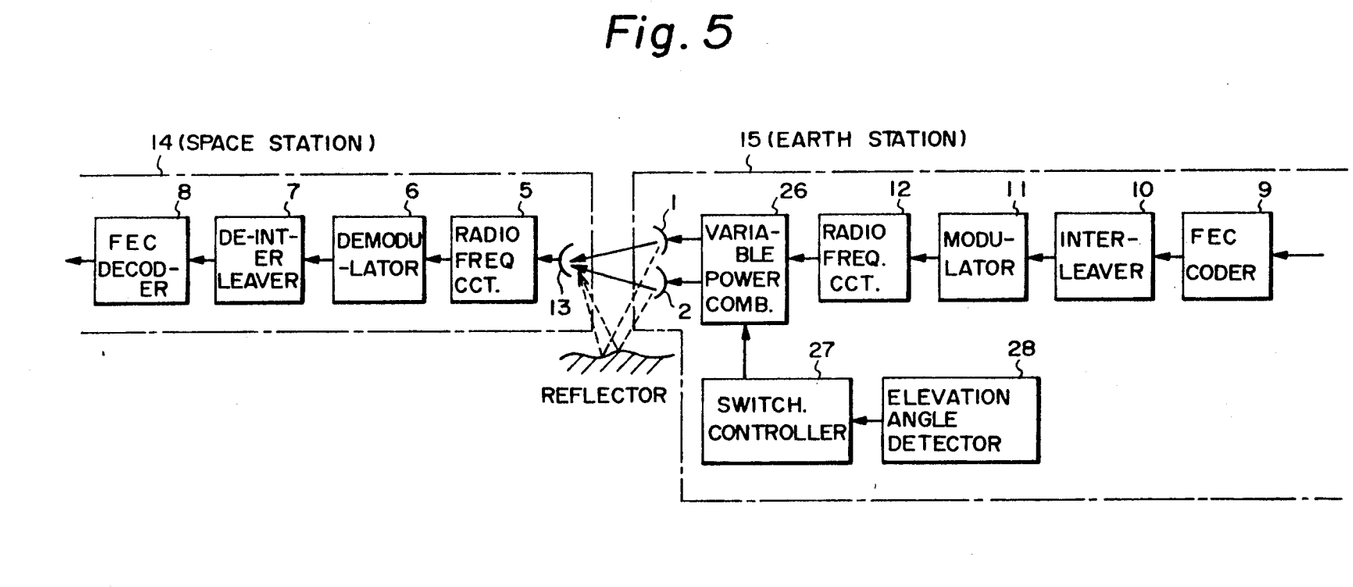
FIG. 5 is a block diagram illustrating a transmitting earth station.

FIG. 5 illustrates an example of the basic constitution for transmission from the ship station, i.e. for transmission from an earth station. A variable power divider 26 successively or discretely switches transmission signals to the two antennas 1 and 2 at a predetermined proper switching period shorter than that of fading to distribute the signals to the antennas in an arbitrary ratio. A controller 27 controls the dividing ratio of the output of the variable power divider 26. Reference numeral 28 indicates an elevation angle detector for detecting whether or not the incidence angle of the direct wave or the satellite elevation angle is smaller than a predetermined value. The functions of the other components are the same as those described previously with respect to FIG. 1.

Incidentally, the variable power combiner 3 in FIG. 4 can be used as the variable power divider 26, by reversing the flow of signals. In this case, however, the combiner 20 is used as a divider.

Figure 6:
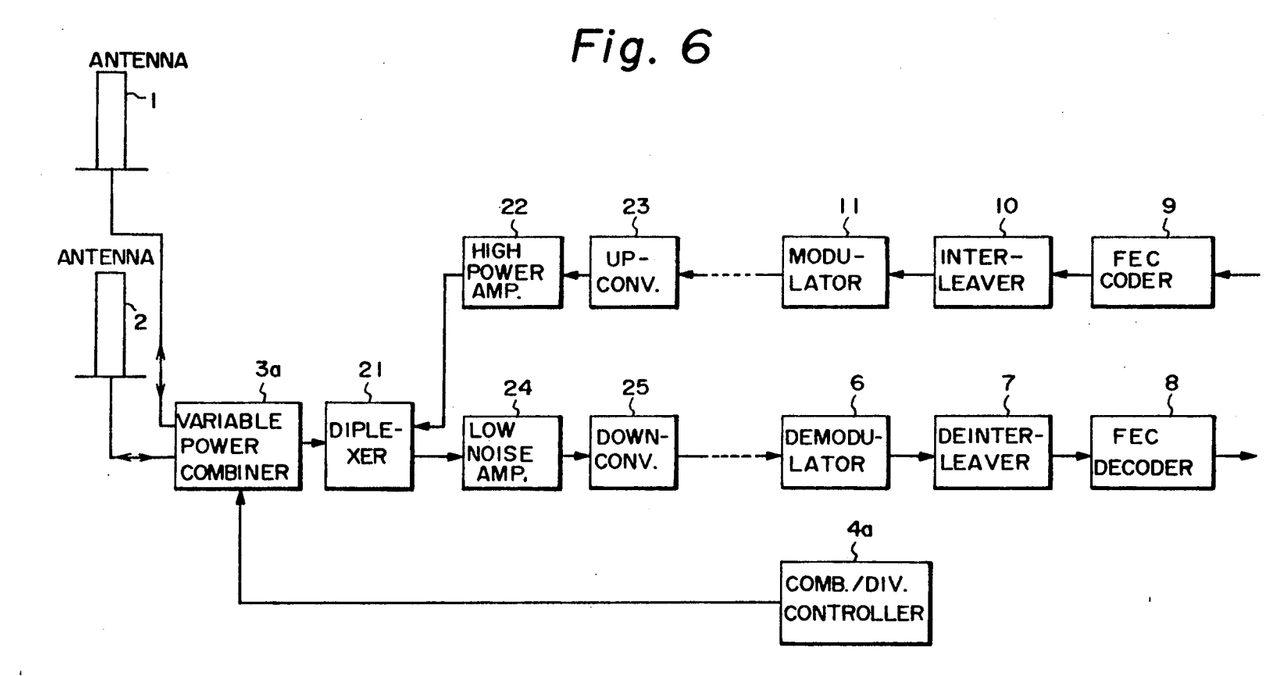
FIG. 6 is a block diagram illustrating an IMMARSAT standard C ship earth station according to the present invention.

FIG. 6 illustrates an embodiment of the present invention for application to a standard C ship earth station of the INMARSAT system (G/T: $-24$ dBK). No particular limitations are imposed on the types of antennas to be used, but a quadrifiler helix antenna is suitable for use in this instance. The antennas are spaced, for example, 30 to 40 cm apart in the vertical direction so that they are negatively correlated with each other in terms of fading. The intended purpose is achieved by switching, with a variable combiner/divider 3a, two signals to be received by the antennas 1 and 2 (signals to be provided to the antennas in the case of transmission) at switching periods (0.1 to 10 sec, for example) preset by a combiner/divider controller 4a. This embodiment will hereinafter be described following the flow of signals.

At first, the receiving system will be described. Radio waves from the satellite are received by the antennas 1 and 2. The two signals are combined by the variable combiner/divider 4a placed under control of the combiner/divider controller 4a and the combined signal is applied to a diplexer 21 which is a reception/transmission separation filter, wherein it is isolated from a signal to be transmitted. The output signal from the diplexer 21 is provided to the demodulator 6 via a low-noise amplifier (hereinafter referred to as an "LNA") 24 which is highly sensitive to a very small signal but low-noise and via a frequency converter (hereinafter referred to as a "down-counter") 25 for converting a high-frequency signal to an intermediate-frequency signal. The demodulator 6 and the succeeding circuits are the same as those described previously in respect of FIG. 1, and fading which occurs in the receiving side of the ship station is suppressed by the afore-described operations. Incidentally, the diplexer 21, the LNA 24 and the D/C 25 correspond to the radio frequency circuits 5 in FIG. 1.

Next, a description will be given of transmission in the embodiment of FIG. 6. A signal combined with an error correcting code by the FEC coder 9 is subjected to the time series conversion by the interleaver 10 and the modulation by the modulator 11. The operations to this point are the same as described previously with reference to FIGS. 1 and 5. The output of the modulator 11 is converted into a high-frequency signal by a frequency converter (hereinafter referred to as an "up-converter") 23 which converts an intermediate-frequency signal to a high-frequency signal. The high-frequency signal is subjected to power amplification by a high power amplifier (hereinafter referred to as an "HPA") 22. The amplified signal is applied to the diplexer 21, wherein it is isolated from the received signal, thereafter being provided to the variable combiner/divider 3a. The variable combiner/divider 3a divides the input signal to the antennas 1 and 2 in accordance with the control signal from the combiner/divider controller 4a. When the combining ratio of the combiner/divider controller 4a varies with a period of 0.1 to 10 sec, the signal strength at the satellite side also varies with the same period as mentioned just above. Thus, the influence of burst-like errors on the transmitted signal from the ship station is also spread with time when the signal is transmitted to the space station, and consequently, even if the transmitted signal is received by one antenna on the space station, it is possible to obtain the same results as in the case where the received signals are periodically switched between the two antennas on the ship station. In other words, such a signal varying with a relatively short period is subjected to error correction by the actions of the de-interleaver and the FEC decoder of the receiving station, resulting in the alleviation of fading also in the transmitted signal.

Figure 7:
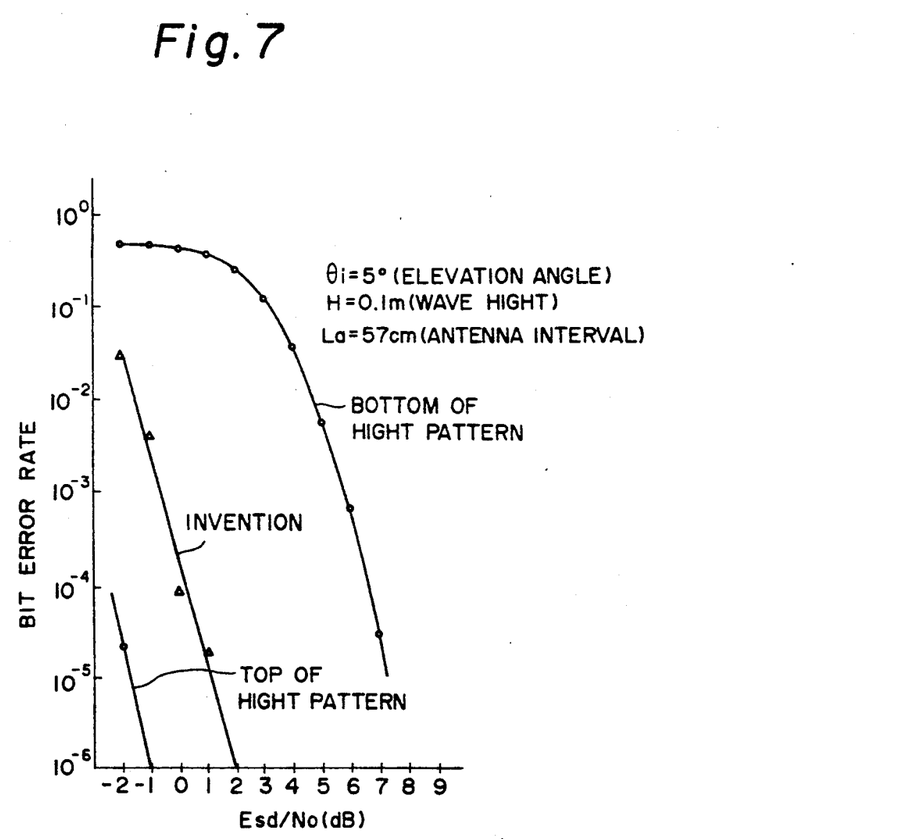
FIG. 7 is a characteristic diagram showing the bit error ratio (BER) and the power-to-noise power density ratio (Esd/No) per symbol according to the present invention.

FIG. 7 is a graph showing the results of simulation by the present invention, that is, the bit error ratio (BER) and the signal-to-noise ratio (Esd/No) per symbol in the case where the satellite elevation angle $\theta i$ was 5°, the switching period $T_0$ was 0.1 sec, the wave height H was 0.1 m, the antenna spacing was 57 cm and the frequency was in the L band (1.5 GHz). As shown, the crest (the best case) and the trough (the worst case) of height patterns in the case where the present invention is not applied become characteristics indicated by white circles and black circles, and with the present invention, the ratio Esd/No can be expected to be improved about 5 dB as compared with that in the worst case and a bit error ratio of about $10^{-4}$ can be obtained when Esd/No is 0 dB.

As described above, according to the present invention, when the incidence angle of the direct wave or the satellite elevation angle becomes smaller than a predetermined value, antennas are switched with a period shorter than that of fading (i.e. the interference wave) to spread burst-like errors with time, by which the interleave (or de-interleave function and the error correcting function can be effectively performed; so that there is no need of employing the feedback system which controls the antenna switching, based on the transmission quality as in the prior art. Moreover, since the burst-like errors in the transmitted and received signals are spread with time in the radio station near the source of interference wave, the influence of fading can be lessened simply by effecting antenna switching control only at the radio station near the source of interference wave.

It is possible to implement a receiving device with the interference eliminating function by which the influence of the interference wave can be lessened, without using the feedback system, by switching the antennas with a period shorter than that of fading (i.e. the interference wave) and the data storage time of the interleaver to spread burst-like errors with time when the incidence angle of the direct wave or the satellite elevation angle becomes smaller than a predetermined value.

By switching the transmitted signal at the radio station near the source of interference in synchronism with the received signal as mentioned above, it is possible to implement a transmitting device with the interference eliminating function by which the influence of the interference signal in the received signal at the receiving station can also be lessened.

Thus, the present invention is applicable to the ship station of the maritime satellite communication system or the mobile station of the mobile communication system, for example, the automobile radio communication system. Hence, the invention is of great utility.

What we claim is:

1. A fading or interference elimination system for a digital radio communication system including in combination, a forward error correction (FEC) function or like error correction function and a data scrambling function by an interleaver comprising:

in one radio station of the radio communication system which is physically closer to the source causing fading or interference such as a sea or ground reflected wave;

at least two antennas disposed so as to be negatively correlated or uncorrelated in terms of fading of a received radio wave;

a variable power combiner for alternative switching of received signals from said antennas;

a combiner controller for generating an alternative switching signal for the variable power combiner with a switching period shorter than a fluctuation period of said fading;

a demodulator for demodulating received signals and detecting transmitting data sequences;

a de-interleaver for recovering an original data sequence from a scrambled data sequence made by an interleaver in a transmitting system related to the receiving system; and a forward error correction (FEC) decoder for making an error correction in the recovered original data;

in which long-lasting burst errors due to long-lasting fading are converted into short-lasting burst errors through the alternative antenna switching in the receiving system, and the short-lasting burst errors are converted into random errors by a function of said de-interleaver, and said random errors are corrected by said forward error correction (FEC) decoder.

2. A fading or interference elimination system for a digital radio communication system including, in combination, a forward error correction (FEC) function or like error correction function and data scrambling function by an interleaver, comprising:

a forward error correction (FEC) coder for adding an error correcting code to original information data;

an interleaver for scrambling a data sequence created by the forward error correction (FEC) coder;

a modulator for producing a radio-frequency signal including transmitting signal information;

at least two antennas disposed so as to be negatively correlated or uncorrelated in terms of fading of a transmitting radio wave;

a variable power divider for alternative switching of transmitting signals to said antennas; and a divider controller for generating an alternative switching signal for the variable power divider with a switching period shorter than a fluctuation period of said fading;

wherein long-lasting burst errors due to long-lasting fading are converted into short-lasting burst errors through the alternative antenna switching at the transmitting station located in the opposite direction of a receiving site, and received short-lasting burst errors are converted into random errors by a function of the de-interleaver in the receiving system, and the random errors are corrected by the forward error correction (FEC) decoder in the receiving system.

* * * * *